United States Patent
Shuto et al.

(10) Patent No.: US 8,641,463 B2
(45) Date of Patent: Feb. 4, 2014

(54) CONTRA-ROTATING PROPELLER MARINE PROPULSION DEVICE

(75) Inventors: Hideki Shuto, Tokyo (JP); Saiki Nishiyama, Tokyo (JP)

(73) Assignee: Japan Marine United Corporation, Tokyo (JP)

( * ) Notice: Subject to any disclaimer, the term of this patent is extended or adjusted under 35 U.S.C. 154(b) by 381 days.

(21) Appl. No.: 12/812,450

(22) PCT Filed: Nov. 28, 2008

(86) PCT No.: PCT/JP2008/071643
§ 371 (c)(1),
(2), (4) Date: Oct. 12, 2010

(87) PCT Pub. No.: WO2009/087832
PCT Pub. Date: Jul. 16, 2009

(65) Prior Publication Data
US 2011/0021095 A1    Jan. 27, 2011

(30) Foreign Application Priority Data
Jan. 9, 2008   (JP) ................. 2008-002512

(51) Int. Cl.
*B63H 21/38* (2006.01)
(52) U.S. Cl.
USPC ............................................ 440/80; 440/81
(58) Field of Classification Search
USPC ...................... 440/80, 81; 416/129
See application file for complete search history.

(56) References Cited

U.S. PATENT DOCUMENTS

| | | | |
|---|---|---|---|
| 3,396,800 A * | 8/1968 | Hillander et al. | 416/126 |
| 3,527,545 A | 9/1970 | Campbell et al. | |
| 4,642,059 A | 2/1987 | Nohara | |
| 5,374,208 A | 12/1994 | von Bergen et al. | |
| 5,795,200 A | 8/1998 | Larkin | |
| 6,506,120 B1 | 1/2003 | Lockwood | |
| 2008/0089786 A1 | 4/2008 | Sinreich | |

FOREIGN PATENT DOCUMENTS

| | | |
|---|---|---|
| JP | 54-87600 | 6/1979 |
| JP | 55-36020 | 3/1980 |
| JP | 60-18094 | 2/1985 |
| JP | 60-18095 | 2/1985 |
| JP | 61-52599 | 4/1986 |
| JP | 61-94611 | 6/1986 |
| JP | 61-99752 | 6/1986 |
| JP | 62-181998 | 8/1987 |

(Continued)

OTHER PUBLICATIONS

English translation of Office Action issued in related Korean application 10-2010-7013243 on Jun. 26, 2012.

(Continued)

*Primary Examiner* — Edwin Swinehart
(74) *Attorney, Agent, or Firm* — Griffin & Szipl, P.C.

(57) ABSTRACT

Lubricant oil (45) serving as second lubricant oil is supplied into an outer intermediate shaft (11c) by a lubricant oil supply unit (50) and accumulated therein, and thereby the lubricant oil (45) is supplied to a contra-rotating front seal unit (37). Thus, by bringing the front side of the contra-rotating front seal unit (37) (seal ring (37b)) into a wet state by the lubricant oil (45), it is possible to reduce heat generation and it is possible to extend the life of the contra-rotating front seal unit (37).

4 Claims, 4 Drawing Sheets

(56) References Cited

FOREIGN PATENT DOCUMENTS

| | | | | |
|---|---|---|---|---|
| JP | 63-66400 | 5/1988 | | |
| JP | 1-87996 | 6/1989 | | |
| JP | 1-240399 | 9/1989 | | |
| JP | 01237289 A * | 9/1989 | ............... | B63H 5/10 |
| JP | 6-27519 Y2 | 7/1994 | | |
| JP | 7-10085 | 1/1995 | | |
| JP | 7-33084 A | 2/1995 | | |
| JP | 7-52881 | 2/1995 | | |
| JP | 7-21437 Y2 | 5/1995 | | |
| JP | 11-270571 | 10/1999 | | |
| JP | 2005-67436 A | 3/2005 | | |

OTHER PUBLICATIONS

International Search Report, issued in corresponding application PCT/JP208/071641, completed Feb. 23, 2009, mailed Mar. 3, 2009.
International Search Report, issued in co-pending application of PCT/JP2008/071643, completed Feb. 20, 2009, mailed Mar. 3, 2009.
International Search Report, issued in co-pending application of PCT/JP2008/071650, completed Feb. 20, 2009, mailed Mar. 3, 2009.
Notice of Allowance issued in co-pending related U.S. Appl. No. 12/864,494 on Feb. 13, 2013.
Office Action issued in co-pending related U.S. Appl. No. 12/812,025 on Feb. 21, 2013.

* cited by examiner

CONTRA-ROTATING PROPELLER MARINE PROPULSION DEVICE

This is a National Phase Application in the United States of International Patent Application No. PCT/JP2008/071643 filed Nov. 28, 2008, which claims priority on Japanese Patent Application No. 2008-002512, filed Jan. 9, 2008. The entire disclosures of the above patent applications are hereby incorporated by reference.

TECHNICAL FIELD OF THE INVENTION

The present invention relates to a contra-rotating propeller marine propulsion device.

BACKGROUND OF THE INVENTION

Description of the Related Art

A contra-rotating propeller is a propeller system in which the rotational energy output from a front propeller is recovered by a rear propeller that rotates in a direction opposite to the front propeller and changed into a propulsive force so that high propeller efficiency is obtained. Hereinafter, a marine propulsion device equipped with a contra-rotating propeller is referred to as a "contra-rotating propeller marine propulsion device." The contra-rotating propeller marine propulsion device is disclosed in the following Patent Document 1, for example.

As one of conventional examples of the contra-rotating propeller marine propulsion device, the "contra-rotating propeller device" disclosed in Patent Document 1 is shown in FIG. 1. In the contra-rotating propeller device 100 of FIG. 1, a rear propeller 101 is attached to a rear end of an inner shaft 102 connected to a main engine (not shown). A front propeller 103 is attached to a rear end of an outer shaft 104 connected to a reversing gear (not shown), and the front propeller 101 and the rear propeller 103 are reversely driven.

The weight of the inner shaft 102 is supported by a front inner bearing 105 mounted on the inner surface of the outer shaft 104, and a rear inner bearing 106 mounted in a boss of the rear propeller 101, and the weight applied to the outer shaft 104 is supported by a front outer bearing 107 and a rear outer bearing 108 mounted on a ship body 113. In order to prevent the lubricant oil supplied to the respective bearings 105 to 108 from flowing out to the outside or inside of a ship, front and rear inner seal units 109 and 110, and front and rear outer seal units 111 and 112 are provided.

[Patent Document 1] Japanese Patent Application Laid-Open No. 7-10085

In the contra-rotating propeller, a seal portion of a front inner seal unit (hereinafter referred to as a contra-rotating front seal unit) generates heat due to rotational sliding. Although the rear side (stern side) of the contra-rotating front seal unit is in a wet state due to the contra-rotating lubricant oil, since the front side (bow side) is in a dry state, the temperature thereof become very high. For this reason, wear of the contra-rotating front seal unit is severe, which becomes a factor that shortens the life of the contra-rotating front seal unit.

SUMMARY OF THE INVENTION

The invention was made in view of the above problem, and aims at providing a lubrication system of a contra-rotating seal in a propulsion device of a ship capable of reducing heat generation on the front side of a contra-rotating front seal unit, thereby extending the life of the contra-rotating front seal unit.

In order to solve the above-mentioned problem, the contra-rotating propeller marine propulsion device of the invention adopts the following technical means.

(1) The invention provides a contra-rotating propeller marine propulsion device including a hollow outer shaft having a front propeller attached to a rear end thereof and rotatably supported by a ship body, an inner shaft having a rear propeller attached to a rear end thereof and rotatably supported in the outer shaft, a contra-rotating front bearing and contra-rotating rear bearing provided at a distance in an axial direction between the outer shaft and the inner shaft for rotatably supporting the inner shaft with respect to the outer shaft, and a contra-rotating front seal unit and a contra-rotating rear seal unit respectively provided in front of the contra-rotating front bearing and behind the contra-rotating rear bearing for preventing the leakage of first lubricant oil supplied to the contra-rotating front bearing and the contra-rotating rear bearing, and making the front propeller and the rear propeller rotate in directions opposite to each other by a rotational driving power. The outer shaft has a hollow outer intermediate shaft surrounding the contra-rotating front seal unit connected to the rotational driving power side. The propulsion device further includes lubricant oil supply means that supplies second lubricant oil into the outer intermediate shaft. The second lubricant oil is supplied to the contra-rotating front seal unit as the second lubricant oil is accumulated in the outer intermediate shaft.

Here, the above "second lubricant oil" may be dedicated lubricant oil supplied only to the inside of the outer intermediate shaft or may be lubricant oil used for the purpose of the lubrication of other parts as long as the lubricant oil is lubricant oil supplied into the outer intermediate shaft. In the present embodiment, the "lubricant oil 45" corresponds to the second lubricant oil.

According to the construction of the invention, the second lubricant oil is supplied into the outer intermediate shaft by the lubricant oil supply means and accumulated therein, and thereby the second lubricant oil is supplied to the contra-rotating front seal unit. Thus, by bringing the front side of the contra-rotating front seal unit into a wet state by the second lubricant oil, it is possible to reduce heat generation and it is possible to extend the life of the contra-rotating front seal unit.

(2) In the contra-rotating propeller marine propulsion device of the above (1), preferably, the outer intermediate shaft is constructed so as to be capable of being radially split into a plurality of pieces.

According to the above construction, it is possible to simply perform the maintenance of accessory parts (contra-rotating front seal unit, etc.) of the inner shaft simply by disassembling the outer intermediate shaft.

(3) In the contra-rotating propeller marine propulsion device of the above (1), preferably, an oil amount adjusting unit, which has a circular opening and functions as a dam, thereby adjusting the amount of the second lubricant oil accumulated in the outer intermediate shaft, is provided on the front side of the outer intermediate shaft, and the second lubricant oil is supplied into the outer intermediate shaft through the circular opening from the front side; the second lubricant oil in the outer intermediate shaft rotates along with the outer intermediate shaft, and sticks to the inner peripheral surface of the outer intermediate shaft due to the centrifugal force during the rotation, thereby forming a hollow cylindrical shape; the diameter of the circular opening is set so that the second lubricant oil of an amount such that the second lubricant oil is able to be supplied to the contra-rotating front seal unit is accumulated in the outer intermediate shaft; and the second lubricant oil of an amount exceeding the storage capacity of the outer intermediate shaft is discharged from the circular opening.

According to the above construction, the amount of the second lubricant oil that is accumulated in the outer intermediate shaft is automatically adjusted to a certain amount such that the second lubricant oil is able to be supplied to the contra-rotating front seal unit, by the oil amount adjusting unit provided on the front side of the outer intermediate shaft. Thus, only by supplying the second lubricant oil to the outer intermediate shaft, the second lubricant oil is accumulated to a level required to supply the second lubricant oil to the contra-rotating front seal unit, and the overflowing oil is discharged automatically. Thus, it is possible to construct a lubrication structure capable of performing storage amount control automatically without using a complicated liquid-level control mechanism.

(4) In the contra-rotating propeller marine propulsion device of the above (3), preferably, the contra-rotating propeller marine propulsion device includes a driving unit that is a rotational driving power, and a power transmission unit which outputs the rotational driving force of the driving unit from an outer output shaft and an inner output shaft which are concentrically and rotatably provided, wherein the outer output shaft and the outer intermediate shaft are connected together via a gear coupling; the second lubricant oil is supplied into the outer intermediate shaft through an engagement portion of the gear coupling; and the second lubricant oil of an amount exceeding the storage capacity of the outer intermediate shaft is discharged from a lower engagement portion of the gear coupling through the circular opening.

According to the above construction, the second lubricant oil is supplied into the outer intermediate shaft through the engagement portion of the gear coupling. For this reason, it is possible to utilize the lubricant oil for lubricating the gear coupling as the second lubricant oil, which is supplied to the contra-rotating front seal unit as it is. Additionally, since the engagement portion of the gear coupling functions as a supply port and a discharge port of the second lubricant oil, there is no need to provide a supply port and a discharge port that are dedicated to the supply and discharge of the second lubricant oil.

(5) In the contra-rotating propeller marine propulsion device of the above (4), preferably, the power transmission unit is a gear drive mechanism, and has a housing which houses the outer output shaft and the inner output shaft; a hood which covers the gear coupling and communicates with the inside of the housing is provided on the rear side of the housing; and the second lubricant oil is supplied to the gear coupling from the housing side.

According to the above construction, the second lubricant oil is supplied to the gear coupling from the housing side of the power transmission unit. For this reason, it is possible to make the lubricant oil supply system for supplying the lubricant oil to the outer intermediate shaft common to the power transmission unit.

According to the contra-rotating propeller marine propulsion device of the invention, the excellent effect capable of reducing heat generation on the front side of the contra-rotating front seal unit, and thereby extending the life of the contra-rotating front seal unit is obtained.

Thus, in accordance with a first non-limiting illustrative embodiment of the present invention, a contra-rotating propeller marine propulsion device is provided that includes (a) a hollow outer shaft having a front propeller attached to a rear end thereof and that is rotatably supported by a ship body, (b) an inner shaft having a rear propeller attached to a rear end thereof and rotatably supported in the outer shaft, (c) a contra-rotating front bearing and contra-rotating rear bearing provided at a distance in an axial direction between the outer shaft and the inner shaft for rotatably supporting the inner shaft with respect to the outer shaft, and (d) a contra-rotating front seal unit and a contra-rotating rear seal unit respectively provided in front of the contra-rotating front bearing and behind the contra-rotating rear bearing for preventing the leakage of first lubricant oil supplied to the contra-rotating front bearing and the contra-rotating rear bearing, and making the front propeller and the rear propeller rotate in directions opposite to each other by a rotational driving power, wherein the outer shaft has a hollow outer intermediate shaft surrounding the contra-rotating front seal unit connected to the rotational driving power side, and wherein the propulsion device further comprises (e) lubricant oil supply means that supplies second lubricant oil into the outer intermediate shaft, and wherein the second lubricant oil is supplied to the contra-rotating front seal unit as the second lubricant oil is accumulated in the outer intermediate shaft. In accordance with a second non-limiting illustrative embodiment of the present invention, the first non-limiting embodiment is modified so that the outer intermediate shaft is constructed so as to be capable of being radially split into a plurality of pieces.

In accordance with a third non-limiting illustrative embodiment of the present invention, the first non-limiting embodiment is modified so that an oil amount adjusting unit, which has a circular opening and functioning as a dam, thereby adjusts the amount of the second lubricant oil accumulated in the outer intermediate shaft, and is provided on the front side of the outer intermediate shaft, and the second lubricant oil is supplied into the outer intermediate shaft through the circular opening from the front side, wherein the second lubricant oil in the outer intermediate shaft rotates along with the outer intermediate shaft, and sticks to the inner peripheral surface of the outer intermediate shaft due to the centrifugal force during the rotation, thereby forming a hollow cylindrical shape, wherein the diameter of the circular opening is set so that the second lubricant oil, of an amount such that the second lubricant oil is able to be supplied to the contra-rotating front seal unit, is accumulated in the outer intermediate shaft, and wherein the second lubricant oil of an amount exceeding the storage capacity of the outer intermediate shaft is discharged from the circular opening. In accordance with a fourth non-limiting illustrative embodiment of the present invention, the third non-limiting embodiment is further modified so that the contra-rotating propeller marine propulsion device comprises (f) a driving unit that is a rotational driving power, and (g) a power transmission unit that outputs the rotational driving force of the driving unit from an outer output shaft and an inner output shaft, which are concentrically and rotatably provided, wherein the outer output shaft and the outer intermediate shaft are connected together via a gear coupling, and wherein the second lubricant oil is supplied into the outer intermediate shaft through an engagement portion of the gear coupling, and wherein the second lubricant oil of an amount exceeding the storage capacity of the outer intermediate shaft is discharged from a lower engagement portion of the gear coupling through the circular opening. In accordance with a fifth non-limiting illustrative embodiment of the present invention, the fourth non-limiting embodiment is further modified so that the power transmission unit is a gear drive mechanism, and has a housing that houses the outer output shaft and the inner output shaft, wherein a hood that covers the gear coupling and that communicates with the inside of the housing is provided on the rear side of the housing, and wherein the second lubricant oil is supplied to the gear coupling from the housing side.

DESCRIPTION OF THE PREFERRED EMBODIMENT

Figure 1:
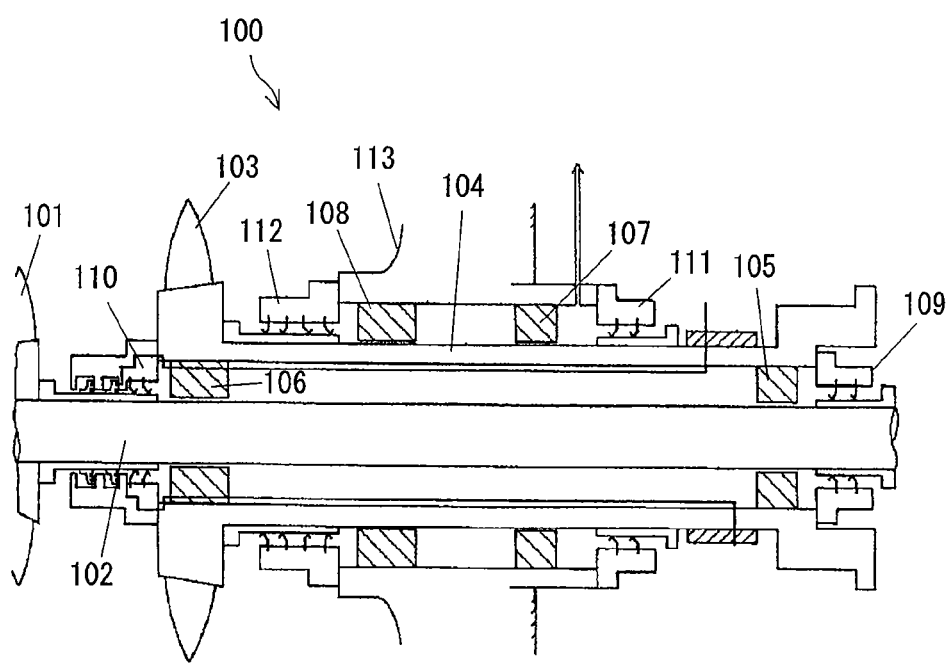
FIG. 1 is a view illustrating a prior art.

Preferred embodiments of the invention will now be described in detail with reference to the accompanying drawings. In addition, in the respective drawings, the same reference numerals will be given to common portions, and duplicate description thereof will be omitted. Additionally, in the following description, the "bow side" and the "front side" have the same meaning and the "stern side" and the "rear side" have the same meaning.

Figure 2:
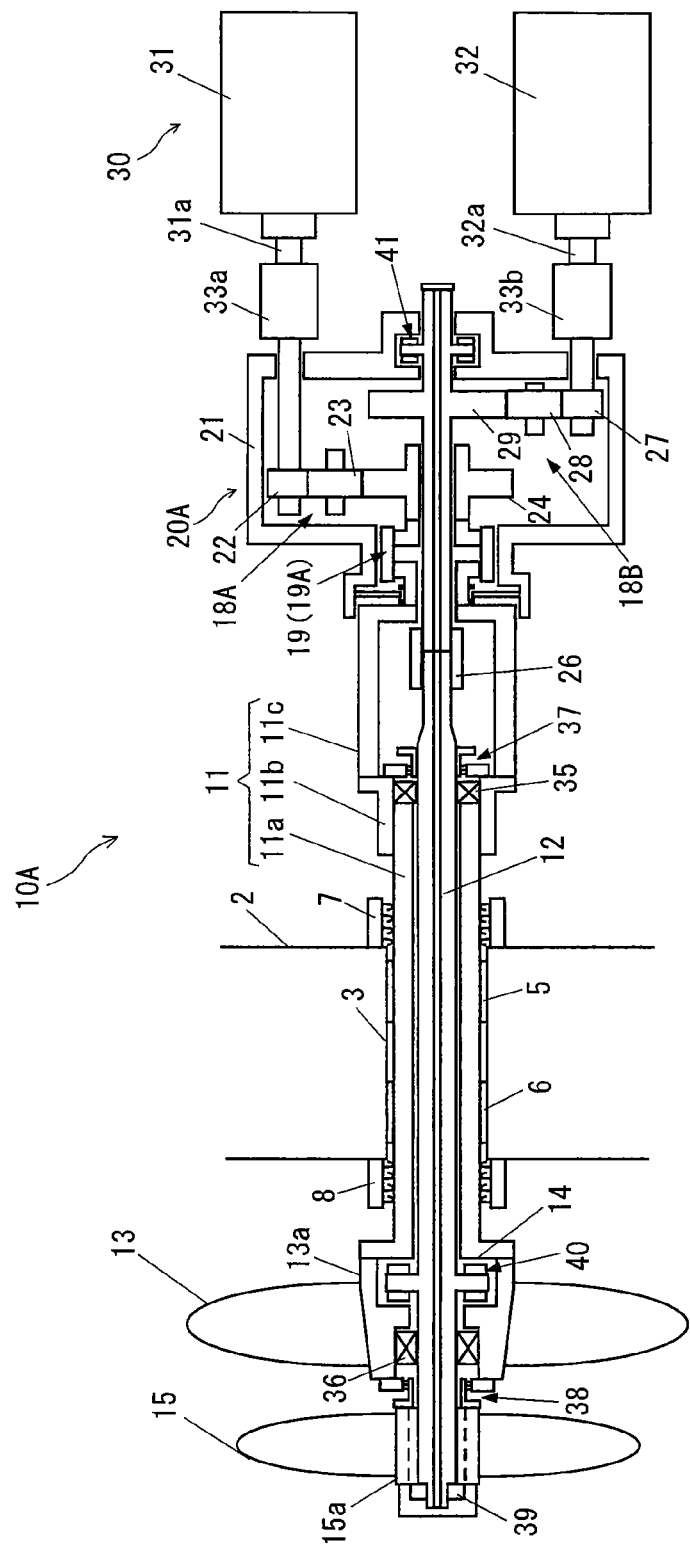
FIG. 2 is a schematic plan view of a contra-rotating propeller marine propulsion device according to a first embodiment of the invention.

FIG. 2 is a schematic plan view of a contra-rotating propeller marine propulsion device 10A according to a first embodiment of the invention. In FIG. 2, the contra-rotating propeller marine propulsion device 10A (hereinafter simply referred to as a "propulsion device") includes an outer shaft 11 to which a front propeller 13 is attached, an inner shaft 12 to which a rear propeller 15 is attached, a driving unit 30 that is a rotational driving power of the outer shaft 11 and the inner shaft 12, and a power transmission unit 20A which transmits the rotational driving force of the driving unit 30 to the outer shaft 11 and the inner shaft 12.

The outer shaft 11 is a hollow part, and includes an outer shaft body 11a which is set up through a stern tube 3 provided at a ship body 2, an outer sleeve joint 11b which is connected and fixed to a front end of the outer shaft body 11a, and a hollow outer intermediate shaft 11c which is connected and fixed to a front end of the outer sleeve joint 11b.

A front-side bush 5 and a rear-side bush 6 are provided between the stern tube 3 and the outer shaft body 11a, and thereby the outer shaft 11 is rotatably supported by the ship body 2. In order to lubricate the front-side bush 5 and the rear-side bush 6, stern tube lubricant oil is supplied into the stern tube 3 from a stern tube lubricant oil supply unit (not shown).

In order to prevent the leakage of stern tube lubricant oil towards the engine room side, a bow-side end face of the stern tube 3 is provided with a bow-side stern tube seal unit 7. In order to prevent leakage of stern tube lubricant oil in the stern tube 3 towards the seawater and the penetration of the seawater into the stern tube 3, a stern-side end face of the stern tube 3 is provided with a stern-side stern tube seal unit 8.

The front propeller 13 is attached to a rear end of the outer shaft 11. The front propeller 13 has a boss 13a at the central portion thereof, and a bow-side end face of the boss 13a and a stern-side end face of the outer shaft 11 are connected and fixed together by connecting means, such as a bolt.

The inner shaft 12 is a hollow part, has the rear propeller 15 attached to the rear end thereof, and is rotatably supported in the outer shaft 11. The rear propeller 15 has a boss 15a at the central portion thereof, is fitted into a rear end of the inner shaft 12 at the boss 15a, and is fixed to the inner shaft 12 by a propeller nut 39.

In the propulsion device 10A, in order to rotatably support the inner shaft 12 by the outer shaft 11, a front-side radial bearing 35 and a rear-side radial bearing 36 are set up. In the exemplary construction of FIG. 2, the front-side radial bearing 35 is arranged between the outer sleeve joint 11b and the inner shaft 12, and the rear-side radial bearing 36 is arranged between the boss 13a of the front propeller 13 and the inner shaft 12. In addition, the arrangement positions of the front-side radial bearing 35 and the rear-side radial bearing 36 are not limited to the above-described positions. For example, the arrangement positions may be between the front end and rear end of the outer shaft 11, and the inner shaft 12.

In the propulsion device 10A, a contra-rotating thrust bearing 40 which receives the thrust load of the outer shaft 11 and transmits the thrust load to the inner shaft 12 is arranged. In the exemplary construction of FIG. 2, the contra-rotating thrust bearing 40 is provided in the boss 13a of the front propeller 13. More specifically, an annular recess 14 is formed between the boss of the front propeller 13 and the outer shaft 11, and the contra-rotating thrust bearing 40 is provided in this annular recess 14. The contra-rotating thrust bearing 40 may be, for example, a tilting pad type thrust bearing.

In order to lubricate the front-side radial bearing 35, the rear-side radial bearing 36, and the contra-rotating thrust bearing 40, contra-rotating lubricant oil that is first lubricant and which is not shown is supplied to between the outer shaft 11 or the boss 13a of the front propeller 13, and the inner shaft 12 from a contra-rotating lubricant oil supply unit which is not shown. In order to prevent the contra-rotating lubricant oil from leaking out, a contra-rotating front seal unit 37 is arranged at the bow-side end face of the outer sleeve joint 11b, and a contra-rotating rear seal unit 38 is arranged at the stern-side end face of the boss 13a of the front propeller 13.

The driving unit 30 adopted in the exemplary construction of FIG. 2 includes a first driving unit 31 that is the rotational driving power of the outer shaft 11 and a second driving unit 32 that is the rotational driving power of the inner shaft 12. The first driving unit 31 and the second driving unit 32 may be main engines, such as gas-turbine engines and diesel engines, or may be electric motors. In the case of the electric motors, for example, it is possible to load one or a plurality of gas turbine generators, diesel engine generators, etc. on the engine room, and use this as a power.

As such, since the outer shaft 11 and the inner shaft 12 are respectively driven by the independent driving powers (the first driving unit 31 and the second driving unit 32), even if one of the driving powers (for example, the first driving unit 31) fails, it is possible to continue the operation of a ship by driving the front propeller 13 or the rear propeller 15 by the other driving power (for example, the second driving unit 32).

The power transmission unit 20A adopted in the exemplary construction of FIG. 2 is a contra-rotating gear transmission unit which is constructed so that the rotational driving forces of the first driving unit 31 and the second driving unit 32 are independently transmitted to the outer shaft 11 and the inner shaft 12, respectively. More specifically, the power transmission unit 20A has a housing 21, and includes an outer transmission mechanism 18A, and an inner transmission mechanism 18B in the housing 21. In the construction of FIG. 2, both the outer transmission mechanism 18A and the inner transmission mechanism 18B are gear transmission mechanisms.

The outer transmission mechanism 18A has an outer input gear 22 which is arranged coaxially with an output shaft 31a of the first driving unit 31 and has the driving force from the first driving unit 31 input thereto, a hollow outer main output gear 24 which is arranged coaxially with the outer shaft 11 to transmits a rotational driving force to the outer shaft 11, and an outer intermediate small gear 23 which is arranged between the outer input gear 22 and the outer main output gear 24.

The output shaft 31a of the first driving unit 31 and the outer input gear 22 are connected together via a gear coupling 33a so that a shaft center change caused by an miss aliment in installation and change of hull deformation. Although the number of the outer intermediate small gear 23 is one in FIG. 2, a plurality of intermediate small gears may be provided.

The inner transmission mechanism 18B has an inner input shaft 27 which is arranged coaxially with an output shaft 32a of the second driving unit 32 and has the driving force from the second driving unit 32 input thereto, an inner main output gear 29 which is inserted through the hollow portion of the outer main output gear 24, and is arranged coaxially with the inner shaft 12 to transmit a rotational driving force to the inner shaft 12, and an inner intermediate small gear 28 which is arranged between the inner input gear 27 and the inner main output gear 29.

The output shaft of the second driving unit 32 and the inner input gear 27 are connected together via a gear coupling 33b so that a shaft center change caused by an miss aliment in installation and change of hull deformation. Although the number of the inner intermediate small gear 28 is one in FIG. 2, a plurality of intermediate small gears may be provided. The inner main output gear 29 and the inner shaft 12 is connected and fixed together by an inner sleeve joint 26.

In the propulsion device 10A, an inner thrust bearing 41, which receives the thrust load (the combined load of the thrust load of only the inner shaft 12 and the thrust load of only the outer shaft 11) from the inner shaft 12 and transmits the thrust load to the ship body 2, is arranged. In the exemplary construction of FIG. 2, the inner thrust bearing 41 is provided at a bow-side portion of the housing 21 of the power transmission unit 20. For this reason, the thrust load from the inner shaft 12 is supported by the ship body 2 via the housing 21.

In addition, the arrangement position of the inner thrust bearing 41 is not limited to the above-described position if it is possible to transmit the thrust load from the inner shaft 12 to the ship body 2. Accordingly, the inner thrust bearing may be in the housing 21 and may be outside the housing 21 as long as the bearing is closer to the bow side than the outer main output gear 24.

In the exemplary construction of FIG. 2, although both the outer transmission mechanism 18A and the inner transmission mechanism 18B are gear transmission mechanisms, one or both may be other transmission mechanisms (a belt transmission mechanism, a chain transmission mechanism, etc.).

Additionally, in the exemplary construction of FIG. 2, although the outer transmission mechanism 18A and the inner transmission mechanism 18B are housed in the single housing 21, the mechanisms may be housed in separate housings 21.

The outer main output gear 24 and the outer shaft 11 are connected together via a hollow flexible joint 19. In the exemplary construction of FIG. 2, the flexible joint 19 is a gear coupling 19A, the outer output shaft 24 is connected and fixed to the bow side of the gear coupling 19A, and the outer intermediate shaft 11c is connected and fixed to the stern side of the gear coupling 19A. Accordingly, the rotational driving force of the outer main output gear 24 is transmitted to the outer shaft body 11a via the gear coupling 19A, the outer intermediate shaft 11c, and the outer sleeve joint 11b.

In the propulsion device 10A including the above-described construction, the thrust load of the outer shaft 11 is received at the inner shaft 12 by the contra-rotating thrust bearing 40, the combined thrust load of the outer shaft 11 and the inner shaft 12 is received at the ship body 2 by the inner thrust bearing 41, and the rotational force of the outer main output gear 24 is transmitted to the outer shaft 11 via the gear coupling 19A that is the flexible joint 19. Thus, the thrust load of the outer shaft 11 is transmitted to the ship body 2 only via the inner shaft 12 without being directly transmitted to the ship body 2, and the misalignment of the axial center is allowed by the flexible joint 19, so that it is possible to eliminate the influence of the change of hull deformation on the shaft center of the outer shaft 11.

Although a flanged flexible joint, a roller-chain joint, etc. may be used as the flexible joint 19, the gear coupling 19A which has a high allowable transmission torque and is able to allow not only angular displacement but axial displacement is suitable.

In addition, the invention is not limited to the above construction in which the outer main output gear 24 and the outer shaft 11 are connected together via the flexible joint 19, and the outer main output gear 24 and the outer shaft 11 may be connected together by a rigid joint.

Figure 3:
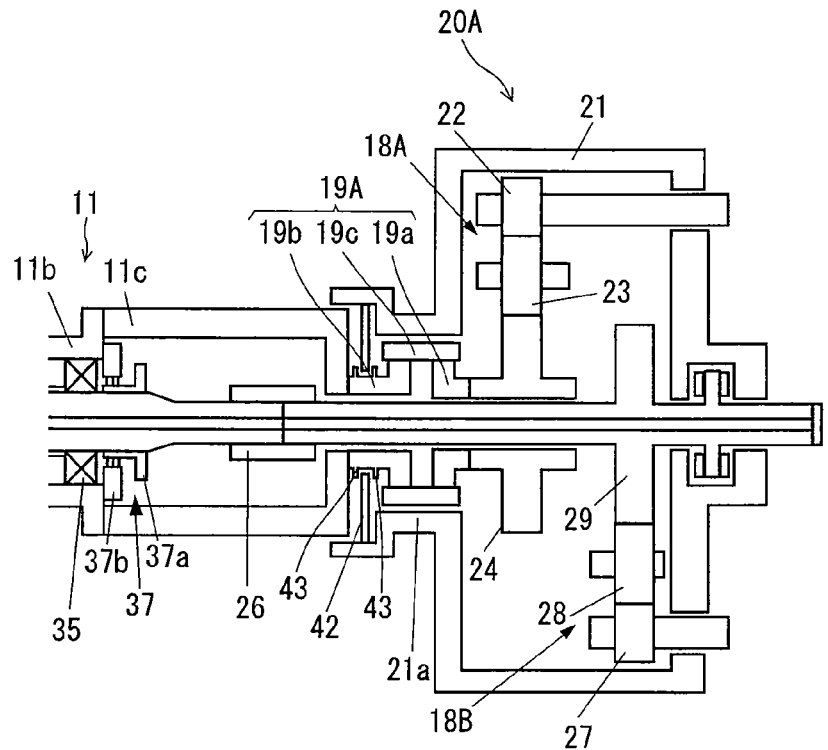
FIG. 3 is an enlarged plan view of a contra-rotating front seal unit and the periphery of a gear coupling in FIG. 2.
Figure 4:
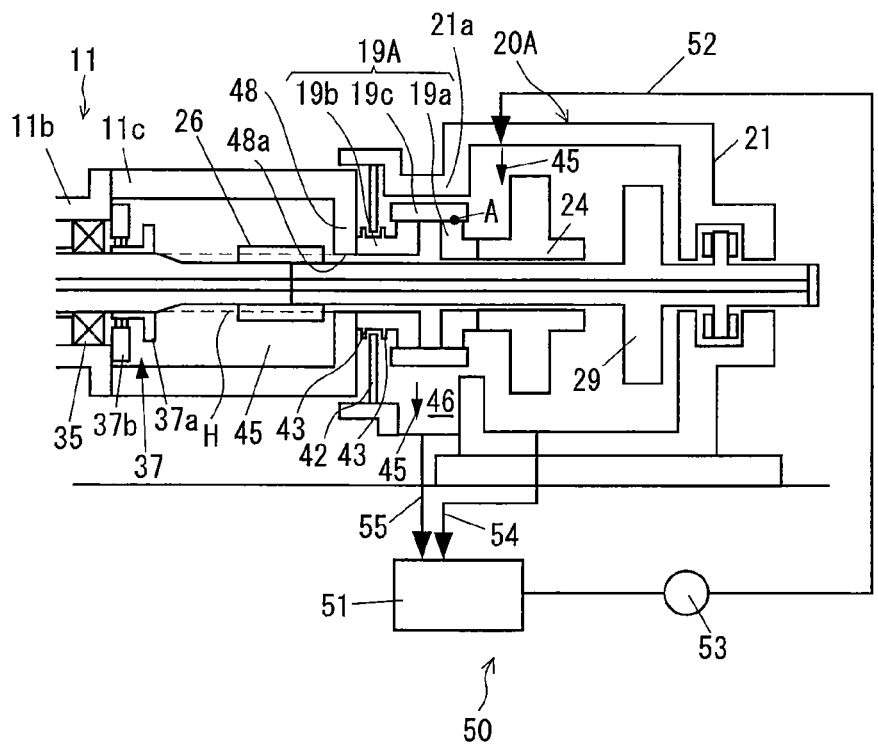
FIG. 4 is an enlarged side view of the contra-rotating front seal unit and the periphery of the gear coupling in FIG. 2.

The construction of the contra-rotating propeller marine propulsion device 10A according to the present embodiment will be described in more detail with reference to FIGS. 3 and 4. FIGS. 3 and 4 are enlarged views of the contra-rotating front seal unit 37 and the periphery of the gear coupling 19A in FIG. 2, FIG. 3 is a schematic plan view, and FIG. 4 is a schematic side view.

In the exemplary construction of FIGS. 3 and 4, the contra-rotating front seal unit 37 includes a hollow liner 37a that is mounted on the inner shaft 12, and a seal ring 37b that is fixed to the outer shaft 11 and is fitted into the liner 37a so as to be rotationally slidable with respect thereto. In addition, the contra-rotating rear seal unit 38 also has the same construction.

The gear coupling 19A adopted in this exemplary construction of FIGS. 3 and 4 includes a first inner cylinder 19a provided on the bow side, a second inner cylinder 19b provided on the stern side, and an outer cylinder 19c surrounding the first inner cylinder 19a and the second inner cylinder 19b, and absorbs the axial displacement, angular displacement, and parallel displacement of a shaft center to transmit the rotational driving force of the outer main output gear 24 towards the outer shaft 11.

Although the gear coupling 19A including the two inner cylinders 19a and 19b and one outer cylinder 19c is adopted in the exemplary construction of FIG. 3, a gear coupling including one inner cylinder and one outer cylinder may be adopted. It is possible to absorb the axial displacement and angular displacement of a shaft center through this type of gear coupling.

By the above-described construction, when the first driving unit 31 is rotationally driven, the driving force thereof is transmitted to the outer shaft 11 via the outer transmission mechanism 18A, the gear coupling 19A, etc., and the front propeller 13 attached to the outer shaft 11 rotates. Additionally, when the second driving unit 32 is rotationally driven, the driving force thereof is transmitted to the inner shaft 12 via the inner transmission mechanism 18B and the inner sleeve joint 26, and the rear propeller 15 attached to the inner shaft 12 rotates.

At this time, it is possible to make the front propeller 13 and the rear propeller 15 rotate in directions opposite to each other by making the outer shaft 11 and the inner shaft 12 rotate in directions opposite to each other. Although the rotational directions of driving shafts of the first driving unit 31 and the second driving unit 32 for making the front propeller 13 and the rear propeller 15 in directions opposite to each other depend on the construction of the power transmission unit 20, in the case of the exemplary construction of FIG. 2, the front propeller 13 and the rear propeller 15 rotate in directions opposite to each other if the rotational directions of the output shafts of the first driving unit 31 and the second driving unit 32 are opposite to each other.

As shown in FIG. 4, in order to lubricate the outer transmission mechanism 18A, the inner transmission mechanism 18B, and the gear coupling 19A, the lubricant oil 45 is supplied into the housing 21. The lubricant oil 45 is supplied into the housing 21 by a lubricant oil supply unit 50. The lubricant oil supply unit 50 includes a lubricant oil tank 51 which stores the lubricant oil 45, a feed oil pipe 52 through which the lubricant oil 45 of the lubricant oil tank 51 is guided to the housing 21, a lubricant oil pump 53 provided on the feed oil pipe 52, a first recovery pipe 54 through which the lubricant oil 45 in the housing 21 is returned to the lubricant oil tank 51, and a second recovery pipe 55 through which the lubricant oil 45 in the hood 21a which will be described later is returned to the lubricant oil tank 51. In addition, it is also possible to connect a downstream end of the second recovery pipe 55 to a middle portion of the first recovery pipe 54.

In FIGS. 3 and 4, a hood 21a, which covers the gear coupling 19A, is provided on the stern side of the housing 21. The housing 21 and the hood 21a communicate with each other and the lubricant oil 45 is supplied to the gear coupling 19A in the hood 21a from the housing 21 side. The hood 21a may be formed integrally with the housing 21, or the housing 21 may be formed as a separate part. Additionally, in order to prevent the leakage of the lubricant oil 45 towards the engine room, an oil-resist plate 42, which has a circular central opening, is provided in the hood 21a in proximity with the outer periphery of the first inner cylinder 19b of the gear coupling 19A.

As such, since the hood 21a surrounding the gear coupling 19A is provided and the lubricant oil 45 is supplied to the gear coupling 19A, the gear coupling 19A is effectively lubricated. Additionally, since a labyrinth structure is formed by the oil-resist plate 42 and the annular convex portion 43, the leakage of the lubricant oil 45 from the gear coupling 19A side towards the engine room is more effectively prevented.

Two annular convex portions 43 which protrude radially outward and extend over the whole periphery in a peripheral direction are provided at an outer periphery of the second inner cylinder 19b so as to be separated from each other in the axial direction. The oil-resist plate 42 is arranged so that an inner peripheral end of a circular central opening thereof is inserted to between the two annular convex portions 43. This construction prevents the lubricant oil 45 from leaking towards the engine room from the gear coupling 19A side. In addition, an oil leakage preventing function may be further improved by a construction in which three or more annular convex portions 43 are provided so as to be separated from each other in the axial direction, two or more oil-resist plates 42 are provided so as to be separated from each other in the axial direction, and an inner peripheral edge of a circular central opening of each oil-resist plate 42 is inserted between the annular convex portions 43.

As shown in FIG. 4, the outer intermediate shaft 11c is provided so as to surround the contra-rotating front seal unit 37, and the lubricant oil 45 is accumulated in the outer intermediate shaft 11c so that the lubricant oil 45 is supplied to the contra-rotating front seal unit 37. Additionally, in the present embodiment, the outer intermediate shaft 11c includes a construction capable of being radially split into a plurality of pieces so that the maintenance of accessory parts (contra-rotating front seal unit 37, etc.) of the inner shaft 12 is able to be performed. The number of splits may be two or more. In addition, liquid is sealed between the respective split pieces of the outer intermediate shaft 11c by a sealing member so that the lubricant oil 45 does not leak to the outside.

An oil amount adjusting unit 48, which has a circular opening 48a and functions as a dam, thereby adjusting the amount of the lubricant oil 45 accumulated in the outer intermediate shaft 11c, is provided on the front side of the outer intermediate shaft 11c. The lubricant oil 45 is supplied into the outer intermediate shaft 11c through the circular opening 48a from the front side. The oil amount adjusting unit 48 may be one formed integrally with the outer intermediate shaft 11c or a part formed separately from the outer intermediate shaft 11c, or may be a portion of the gear coupling 19A.

In FIG. 4, when the gear coupling 19A is lubricated, the lubricant oil 45 penetrates from an engagement portion (between the outer cylinder 19c and the first inner cylinder 19a, which is shown by symbol A in FIG. 4, in the present embodiment) of the gear coupling 19A, enters the outer intermediate shaft 11c through between the gear coupling 19A and the inner shaft 12, and is accumulated therein. The lubricant oil 45 accumulated in the outer intermediate shaft 11c rotates along with the outer intermediate shaft 11c, and sticks to the inner surface of the outer intermediate shaft 11c due to the centrifugal force at that time, thereby forming a hollow cylindrical shape.

The diameter of the circular opening 48a of the oil amount adjusting unit 48 is set so that the lubricant oil 45 of an amount such that the lubricant oil 45 is able to be supplied to the contra-rotating front seal unit 37 (specifically, the front side of the seal ring 37b) is accumulated in the outer intermediate shaft 11c. That is, at the inner peripheral surface (fluid level) of the hollow cylindrical shape, the lubricant oil 45 is accumulated to a level shown by the reference numeral H. Thus, the front side of the contra-rotating front seal unit 37 (seal ring 37b) is brought into a wet state by the lubricant oil 45. The lubricant oil 45 of an amount exceeding the storage capacity of the outer intermediate shaft 11c is discharged from the circular opening 48a.

The lubricant oil 45 discharged from the circular opening 48a returns to the gear coupling 19A side, and is discharged from a discharge port 46 through a lower engagement portion (between the outer cylinder 19c and the first inner cylinder 19a or the second inner cylinder 19b in the present embodiment) of the gear coupling 19A, and is returned to the lubricant oil tank 51 through the second recovery pipe 55.

In the present embodiment, the lubricant oil 45 supplied to the housing 21 by the lubricant oil supply unit 50 is supplied into the outer intermediate shaft 11c via the gear coupling 19A. Accordingly, the lubricant oil supply unit 50 has a function as lubricant oil supply means to supply the lubricant oil 45 as second lubricant oil into the outer intermediate shaft 11c.

In addition, in a case where those other than the gear coupling 19A are used as the flexible joint 19 in the contra-rotating propeller marine propulsion device of the invention, or in a case where a fixed joint is used instead of the flexible joint 19, the lubricant oil 45 cannot be supplied to the outer intermediate shaft 11c only by supplying the lubricant oil 45 into the housing 21. Accordingly, in this case, the lubricant oil 45 may be supplied into the housing 21 by providing a rotary joint at a proper position (for example, the outer periphery of the outer intermediate shaft 11c), and connecting the feed oil pipe 52 to the rotary joint, and this construction may be used as lubricant oil supply means for the outer intermediate shaft 11c described above. Additionally, in this case, a lubricant oil system of the lubricant oil supply means for an outer intermediate shaft 11c may be a system separate from the lubricant oil supply unit 50 shown in FIG. 4.

According to the first embodiment of the invention described above, the following effects are obtained.

(1) According to the present embodiment, lubricant oil 45 serving as second lubricant oil is supplied into an outer intermediate shaft 11c by lubricant oil supply means and accumulated therein, and thereby the lubricant oil 45 is supplied to the front side of a contra-rotating front seal unit 37 (seal ring 37b). Thus, by bringing the front side of the contra-rotating front seal unit 37 into a wet state by the lubricant oil 45, it is possible to reduce heat generation and it is possible to extend the life of the contra-rotating front seal unit 37.

(2) According to the present embodiment, since the construction in which the outer intermediate shaft 11c is able to be radially split into a plurality of pieces is provided, it is possible to simply perform the maintenance of accessory parts (the contra-rotating front seal unit 37, etc.) of the inner shaft 12 only by disassembling the outer intermediate shaft 11c.

(3) According to the present embodiment, the amount of the lubricant oil 45 which is accumulated in the outer intermediate shaft 11c is automatically adjusted to a certain amount such that the lubricant oil 45 is able to be supplied to the contra-rotating front seal unit 37, by the oil amount adjusting unit 48 provided on the front side of the outer intermediate shaft 11c. Thus, simply by supplying the lubricant oil 45 to the outer intermediate shaft 11c, the lubricant oil 45 is accumulated to a level required to supply the lubricant oil 45 to the contra-rotating front seal unit 37, and the overflowing oil is discharged automatically. Thus, it is possible to construct a lubrication structure capable of performing storage amount control automatically without using a complicated liquid-level control mechanism.

(4) According to the present embodiment, the lubricant oil 45 is supplied into the outer intermediate shaft 11c through the engagement portion of the gear coupling 19A. For this reason, it is possible to utilize the lubricant oil 45 for lubricating the gear coupling 19A as the lubricant oil 45 which is supplied to the contra-rotating front seal unit 37 as it is. Additionally, since the engagement portion of the gear coupling 19A functions as a supply port and a discharge port of the lubricant oil 45, there is no need to provide a supply port and a discharge port that are dedicated to the supply and discharge of the lubricant oil 45.

(5) According to the present embodiment, the lubricant oil 45 is supplied to the gear coupling 19A from the housing 21 side of the power transmission unit 20A. For this reason, it is possible to make the lubricant oil supply system for supplying the lubricant oil 45 to the outer intermediate shaft 11c common to the power transmission unit 20A.

Figure 5:
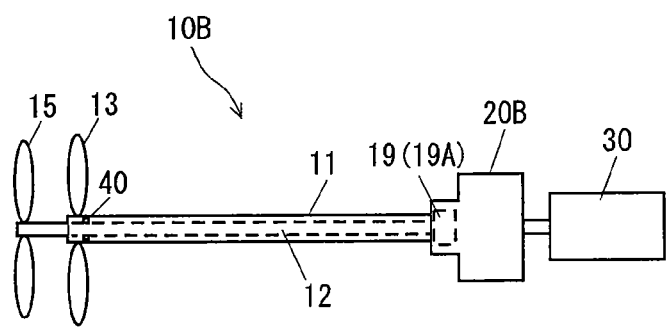
FIG. 5 is a schematic plan view of a contra-rotating propeller marine propulsion device according to a second embodiment of the invention.

FIG. 5 is a schematic plan view of a contra-rotating propeller marine propulsion device 10B according to a second embodiment of the invention. The present embodiment is different from the first embodiment in terms of the driving unit 30 and a power transmission unit 20B. Although FIG. 5 illustrating the present embodiment is simplified compared to FIG. 2 illustrating the first embodiment, the present embodiment is the same as the first embodiment regarding portions other than the driving unit 30 and the power transmission unit 20B.

As shown in FIG. 5, in the propulsion device 10B according to the present embodiment, one driving unit 30 is set up, and the power transmission unit 20B is a contra-rotating transmission unit which outputs the rotation of two shafts which rotate in directions opposite to each other, with respect to the rotation input of one shaft. That is, the power transmission unit 20B converts the rotational driving force of a driving unit into driving forces with rotational directions that are opposite to each other, and transmits the driving forces to the outer shaft 11 and the inner shaft 12, respectively. The rotation power of the outer output shaft of the power transmission unit 20B is transmitted to the outer shaft 11 via the gear coupling 19A similarly to the first embodiment.

According to the second embodiment of the invention described above, the same effects as the above (1) to (5) in the first embodiment are obtained.

Thus, in accordance with the above embodiments of the present invention directed to a contra-rotating propeller marine propulsion device, lubricant oil (45) serving as second lubricant oil is supplied into an outer intermediate shaft (11c) by a lubricant oil supply unit (50) and accumulates therein, and thereby the lubricant oil (45) is supplied to a contra-rotating front seal unit (37). Thus, by bringing the front side of the contra-rotating front seal unit (37), (i.e., seal ring (37b)), into a wet state by the lubricant oil (45), it is possible to reduce heat generation and it is possible to extend the life of the contra-rotating front seal unit (37).

In addition, while the preferred embodiments of the invention have been described above, it should be understood that these are exemplary of the invention and the technical scope of the invention is not limited thereto. The scope of the invention is shown in the description of the appended claims. Additionally, various modifications may be made within the scope and the meaning equivalent to the description of the appended claims.

The invention claimed is:

1. A contra-rotating propeller marine propulsion device that makes a front propeller and a rear propeller rotate in directions opposite to each other by a rotational driving power source, wherein the contra-rotating propeller marine propulsion device comprises:

(a) a hollow outer shaft having the front propeller attached to a rear end thereof and the hollow outer shaft is rotatably supported by a ship body;

(b) an inner shaft having the rear propeller attached to a rear end thereof and the inner shaft is rotatably supported in the outer shaft;

(c) a contra-rotating front bearing and a contra-rotating rear bearing provided at a distance in an axial direction between the hollow outer shaft and the inner shaft in order to rotatably support the inner shaft with respect to the hollow outer shaft;

(d) a contra-rotating front seal unit and a contra-rotating rear seal unit respectively provided in front of the contra-rotating front bearing and behind the contra-rotating rear bearing in order to prevent leakage of first lubricant oil supplied to the contra-rotating front bearing and to the contra-rotating rear bearing, and wherein the hollow outer shaft includes a hollow outer intermediate shaft surrounding the contra-rotating front seal unit, and the hollow intermediate shaft is rotated by a driving unit that is the rotational driving power source;

(e) lubricant oil supply means is disposed to supply second lubricant oil into the hollow outer intermediate shaft, and wherein the second lubricant oil is supplied to the contra-rotating front seal unit as the second lubricant oil is accumulated in the hollow outer intermediate shaft; and (f) an oil amount adjusting unit that has a circular opening and functions as a dam, wherein the oil amount adjusting unit is provided on a front side of the hollow outer intermediate shaft, wherein the oil amount adjusting unit is located at a position that exists on a front side of the contra-rotating front seal unit and that is separated from the contra-rotating front seal unit in an axial direction of the hollow outer intermediate shaft, wherein the second lubricant oil from the oil supply means is supplied into the hollow outer intermediate shaft through the circular opening from the front side of the hollow outer intermediate shaft, and wherein a diameter of the circular opening is set so that the second lubricant oil accumulates in the hollow outer intermediate shaft in an amount that enables the second lubricant oil to be supplied to the contra-rotating front seal unit.

2. The contra-rotating propeller marine propulsion device according to claim 1, wherein the oil amount adjusting unit adjusts the amount of the second lubricant oil accumulated in the hollow outer intermediate shaft, and wherein the second lubricant oil in the hollow outer intermediate shaft rotates along with the hollow outer intermediate shaft, and sticks to an inner peripheral surface of the hollow outer intermediate shaft due to centrifugal force during the rotation, thereby forming a hollow cylindrical shape, and wherein the second lubricant oil of an amount exceeding a storage capacity of the hollow outer intermediate shaft is discharged from the circular opening.

3. The contra-rotating propeller marine propulsion device according to claim 2, wherein the contra-rotating propeller marine propulsion device further comprises:

(g) the driving unit that provides rotational driving power; and (h) a power transmission unit that outputs the rotational driving power of the driving unit from an outer output shaft and an inner output shaft that are concentrically and rotatably arranged, wherein the outer output shaft and the hollow outer intermediate shaft are connected together via a gear coupling, and wherein the second lubricant oil is supplied into the hollow outer intermediate shaft through an engagement portion of the gear coupling, and wherein the second lubricant oil of an amount exceeding the storage capacity of the hollow outer intermediate shaft is a discharged from a lower engagement portion of the gear coupling through the circular opening.

4. The contra-rotating propeller marine propulsion device according to claim 3, wherein the power transmission unit is a gear drive mechanism, and the power transmission unit has a housing that houses the outer output shaft and the inner output shaft, wherein a hood that covers the gear coupling and that communicates with an inside of the housing is disposed on a rear side of the housing, and wherein the second lubricant oil is supplied to the gear coupling from a housing side of the power transmission unit.

* * * * *